United States Patent [19]

Bayley

[11] Patent Number: 4,855,582
[45] Date of Patent: Aug. 8, 1989

[54] MOUNTING FOR A SAPPHIRE BALL IN A BAR CODE READER WAND TIP

[75] Inventor: Brian J. Bayley, Palo Alto, Calif.

[73] Assignee: Hewlett-Packard Company, Palo Alto, Calif.

[21] Appl. No.: 207,352

[22] Filed: Jun. 15, 1988

[51] Int. Cl.[4] ............................................. G06K 7/10
[52] U.S. Cl. .................................................. 235/472
[58] Field of Search ....................................... 235/472

[56] References Cited

U.S. PATENT DOCUMENTS 3,784,794  1/1974  Allais .
3,916,184  10/1975  Turner et al. .
4,682,016  7/1987  Pitts ..................................... 235/472

Primary Examiner—Harold I. Pitts
Attorney, Agent, or Firm—James M. Williams

[57] ABSTRACT

A mounting nest for the sapphire ball at the tip of a bar code reader wand has a hemispherical recess that contacts the surface of the sapphire ball to hold the ball securely. The mounting nest is molded from a material having a relatively high index of refraction so the optical effect of the surface of the ball in contact with the recess component can be effectively neutralized. The mounting nest eliminates leakage paths around the sapphire ball for dust, ESD or other contaminants to the sensor and circuitry inside the wand.

16 Claims, 2 Drawing Sheets

MOUNTING FOR A SAPPHIRE BALL IN A BAR CODE READER WAND TIP

SUMMARY AND BACKGROUND OF THE INVENTION

The invention relates to optics for a bar code reader wand, and in particular to an improved mounting for a sapphire ball tip for a bar code reader wand.

Bar code readers are used to input information from bar code tags. Simply by scanning the bar code tag with a hand held wand, an operator can enter data for inventory control, process evaluation, point-of-sale pricing and various other operations. The scanned data may be processed by the bar code reader or relayed via a communications network to a remote host computer. A sapphire ball is often used in the tip of a bar code reader wand, because it provides a very smooth and hard surface that wears well and does not scratch the bar code tags. A sapphire ball also provides a good pivot point on which the wand can tilt for comfortable scanning.

There are, however, two main drawbacks to using a sapphire ball in the tip of the wand. First, the ball must be held firmly in place to prevent its falling out when the wand is dropped or hit on a surface. The mounting for the sapphire ball is a potential entry point for dust and other contaminants, and for electrostatic discharge (ESD) that could damage the sensor and circuitry inside the wand. Since bar code wands are often used in industrial applications where they receive rough handling, sturdy mounting of the sapphire ball in the tip is important.

Second, because sapphire has a high optical index of refraction (1.8) and the ball has a small diameter (on the order of 0.125 inch), the sapphire ball is a very powerful lens element. The effect of this optical element must either be incorporated into the optical train of the wand or it must somehow be neutralized. Incorporating the sapphire ball into the optical train generally requires that the ball be critically positioned with respect to other elements.

One example of a wand design that incorporates the sapphire ball into the optical train of the wand is shown in U.S. Pat. No. 3,784,794, "Electro-Optical Reader for Bar Codes or the Like", to Allais. Allais shows various embodiments in which the sapphire ball is used as a lens element both to focus light from a source in the wand for illuminating the bar code and to direct light reflected from the bar code to detectors in the wand. In several embodiments, the sapphire ball is simply held in a cylindrical passage at the tip of the housing of the wand. In another embodiment, the sapphire ball is mounted in a socket in a threaded aluminum support member.

In all embodiments, there is a fairly short path for leakage around the sapphire ball into the interior of the wand. Because of the optical constraints of incorporating the sapphire ball into the optical train, in all embodiments either the detectors or the light source are glued directly to the surface of the sapphire ball. This increases the susceptibility of the electronic components mounted on the ball to damage if dropped, makes assembly difficult to automate, and makes replacement of individual components of the tip impractical.

In another design known in the prior art and shown in FIG. 1, an optical flat 19 is ground on the sapphire ball 11 to eliminate the optical power of the back surface of the ball. The ball 11 is mounted in a housing 13 which also holds a sensor 15. In the design shown, the housing 13 is threaded so it can be screwed onto the tip of a wand. The ball must be secured, e.g., glued, in the housing in the proper orientation, with the optical flat 19 perpendicular to the optical centerline 17.

This design suffers from several disadvantages. It is expensive to grind the optical flat on the sapphire ball, and fixturing is required to properly orient the flat during assembly. The mounting provides a relatively short leakage path, and voids in the adhesive can result in leakage paths for dust and ESD.

It is an object of this invention to provide an improved mounting for a sapphire ball in the tip of a bar code reader wand that minimizes the effect of the sapphire ball as an optical element, securely holds the ball in place, and eliminates leakage paths around the sapphire ball for dust, ESD or other contaminants to the sensor and circuitry inside the wand.

These and other objects are provided by the mounting structure of the invention, a mounting nest for the sapphire ball having a hemispherical recess that contacts the surface of the sapphire ball to hold the ball securely, and molded from a material having a relatively high index of refraction so the optical effect of the surface of the all in contact with the recess component can be effectively neutralized.

DETAILED DESCRIPTION OF THE INVENTION

Figure 1:
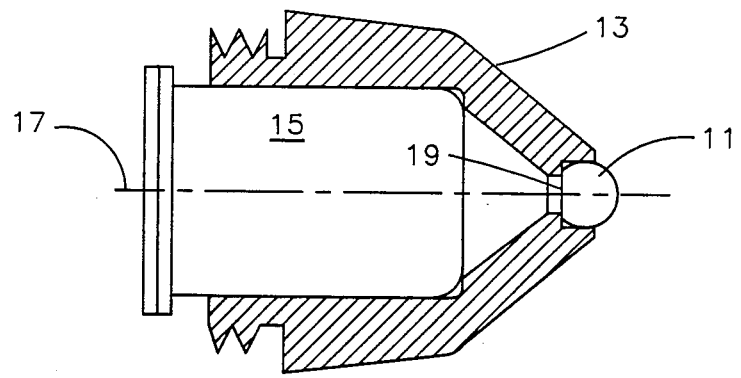
FIG. 1 shows a bar code reader wand tip with a sapphire ball mounting structure known in the prior art.
Figure 2:
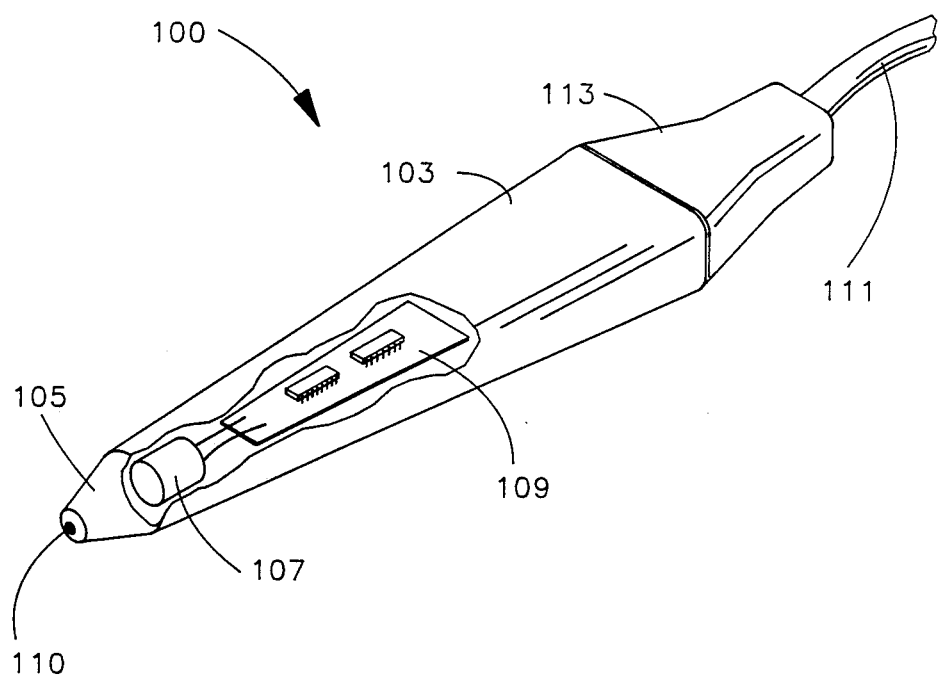
FIG. 2 shows a partially cut away assembly view of a bar code reader wand that incorporates a tip constructed according to the teachings of the invention.

FIG. 2 shows a partially cut away assembly view of a bar code reader wand 100 that incorporates a tip 110 constructed according to the teachings of the invention. A casing 103 holds the optical and electronic components of the bar code reader wand. The end of the casing near the tip 110 has a tapered section 105 to facilitate scanning. The wand tip 110 holds a sapphire sphere that serves as the contact surface for scanning and transmits light into and out of the interior of the casing. Behind the tip is an optical assembly 107. Optical assembly 107 typically includes a light source for illuminating the bar code and a sensor for detecting the light reflected from the bar code. The optical assembly is connected to electronic circuitry 109 that processes the output signal from the sensor. The electronic circuitry 109 may include amplifiers, peak detectors, filters, digitizers and signal decoders. The output signal of the bar code reader wand is connected to a downstream device, such as a computer via an output cable 111 secured to the casing 103 by a backshell 113.

Figure 3:
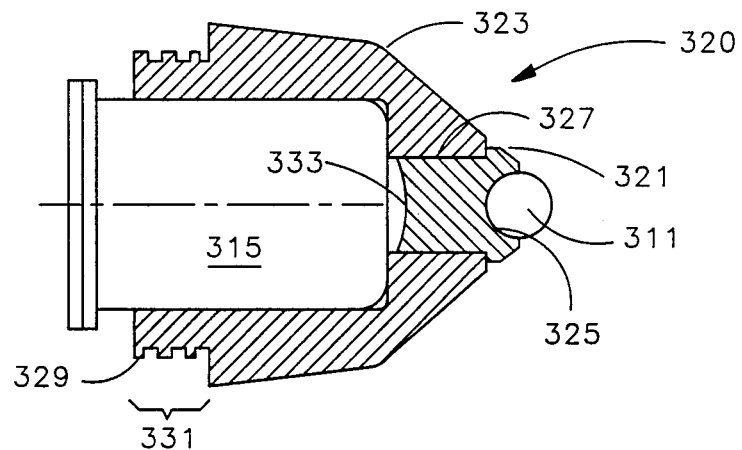
FIG. 3 shows a bar code reader wand tip with a first embodiment of a sapphire ball mounting structure constructed according to the teachings of the invention.
Figure 4:
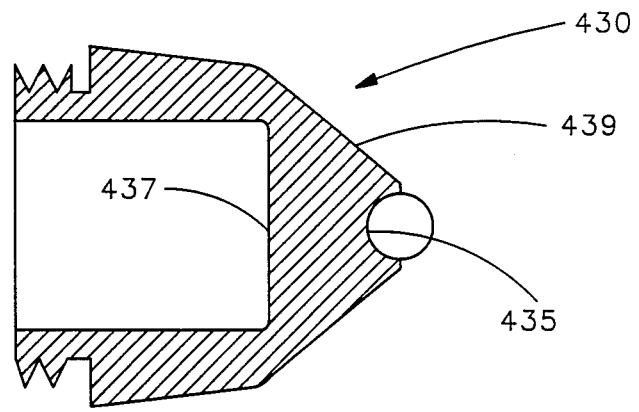
FIG. 4 shows a bar code reader wand tip with a second embodiment of a sapphire ball mounting structure constructed according to the teachings of the invention.
Figure 5:
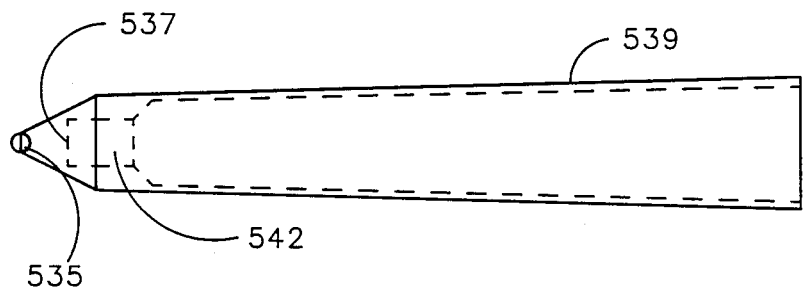
FIG. 5 shows a third embodiment in which the wand casing has a sapphire ball mounting molded into the tip to form a one piece structure.

FIGS. 3, 4 and 5 show sapphire ball mounting structures constructed according to the teachings of the invention. FIG. 3 shows a bar code reader wand tip 320 having a two piece mounting structure that allows the optical and structural components to be made of different materials. FIG. 4 shows a bar code reader wand tip 430 having a one piece mounting structure, in which the wand tip can be molded as one piece. This construction has fewer pieces, so it is easier and cheaper to assemble and has fewer tolerance dimensions that might affect the position of the optical surfaces. FIG. 5 shows a bar code reader wand in which the mounting structure is an integral part of the casing.

In the embodiment shown in FIG. 3, the tip 320 comprises a sapphire ball 311 held in a mounting nest 321, which in turn is attached to housing 323. The housing 323 has a section 331 with ribs 329 for attaching the tip 320 to the casing by ultrasonic welding. Alternatively, the section 331 and the mating part of the casing could be threaded, making the housing and tip removable. As is customary, housing 323 has a space for holding an optical assembly 315, which may include a light source and a sensor.

Mounting nest 321 has a substantially hemispherical recess 325 that conforms to the surface of the ball 311. The sapphire ball is secured in recess 325 by a transparent adhesive such as an optical UV curing adhesive. The relatively large contact surface between the ball 311 and the mounting nest 321 provides for a sturdy, secure mounting. Because the recess 325 does not penetrate the body of the mounting nest 321, this construction eliminates the possibility of leaks into the wand around the sapphire ball.

The mounting nest 321 is fastened in a cylindrical passage 327 in housing 323. This can be done by ultrasonic welding the mating surfaces of the mounting nest 321 and the passage 327, by using an adhesive, by making a press fit between the two pieces, or by a variety of other suitable means. Ultrasonic welding seals the passage, minimizing the possibility that any leaks will occur.

The mounting nest 321 is made from a material having a relatively high index of refraction. The surface of recess 325 forms a first optical surface substantially in contact with the surface of the sapphire ball 311. Plastics such as acrylics and polycarbonates, having indices of refraction of about 1.5 can be used as materials for the mounting nest. Because the plastic has an index of refraction much higher than air, the optical effect at the interface between the first optical surface and the sapphire ball is much smaller. In other words, light rays passing from the sapphire into the plastic are bent much less than light rays would be if they passed from the sapphire into air. As a result, the positioning of the sapphire ball 311 and the mounting nest 321 with respect to the sensor elements is less critical.

In addition, the rear of the mounting nest 321 forms a second optical surface 333 that can be shaped to modify the optical train of the wand. For example, the curvature and position of the surface 333 can be chosen to change the magnification of the wand optics. Thus, by using interchangeable tips with different magnification, the resolution of a wand can be optimized for reading different bar code types simply by changing the tip.

The housing 323 can be made of a variety of materials, since, in this embodiment, its optical properties are not critical.

In a second embodiment, shown in FIG. 4, the tip 430 is molded entirely as one piece. Housing 439 is molded out of high impact plastic having a high optical index of refraction. In this embodiment the color of the housing material should be chosen to block ambient light and pass only light at the illumination frequency. A hemispherical recess 435 is molded into the front of housing 439, and there is no separate mounting nest. As in the first embodiment, the sapphire ball is secured in the recess with an optical adhesive. Similar to the first embodiment, the rear surface of housing 439 forms a second optical surface 437 that can be shaped to provide a desired effect in the optical train of the wand. Housing 439 is shown with a threaded section for attaching the housing to the casing. Of course, this housing could also be made with ribs for ultrasonic welding, as shown in FIG. 3.

FIG. 5 shows a third embodiment in which the wand casing has a sapphire ball mounting molded into the tip to form a one piece structure. Casing 539 is molded out of high impact plastic having a high optical index of refraction. In this embodiment also, the color of the casing material should be chosen to block ambient light and pass only light at the illumination frequency. A hemispherical recess 535 is molded into the front of casing 539, and there is no separate housing or mounting nest. As in the other embodiments, the sapphire ball is secured in the recess with an optical adhesive. Behind the recess 535, a cavity 542 is molded into the casing to hold the optical assembly. Similar to the first embodiment, cavity 542 has a second optical surface 537 that can be shaped to provide a desired effect in the optical train of the wand. The outside surface of the casing can be textured for appearance.

Those skilled in the art will realize that numerous variations of the embodiments described above are possible. There are also many ways of securing the sapphire ball in the recess, for example, a cap or bezel could be used in place of the adhesive.

What is claimed is:

1. In a bar code reader wand having a casing holding an optical assembly for detecting light reflected from a bar code through a sapphire ball at the tip of the wand, a mounting structure for the sapphire ball comprising:
   a mounting nest made of a material having a relatively high optical index of refraction, having a front surface with a recess for mounting the sapphire ball, the shape of the recess conforming substantially to the surface of the sapphire ball, said mounting nest occupying the area between the sapphire ball and the optical assembly, so that the optical path of light passing through the sapphire ball to and from the optical assembly passes through the mounting nest;
   means for securing the sapphire ball in the recess; and
   means for securing the mounting nest to the casing.

2. The mounting structure of claim 1 wherein the means for securing the mounting nest to the casing comprises an ultrasonically welded joint between the mounting nest and the casing.

3. The mounting structure of claim 1 wherein the means for securing the mounting nest to the casing comprises a threaded section of the mounting nest for coupling with a threaded section in the casing.

4. The mounting structure of claim 1 wherein the means for securing the mounting nest to the casing comprises a housing having a passage for receiving the mounting nest, said housing having a section adapted for ultrasonic welding to the casing.

5. The mounting structure of claim 1 wherein the means for securing the mounting nest to the casing comprises a housing having a passage for receiving the mounting nest, said housing having a section adapted for coupling with a threaded section in the casing.

6. The mounting structure of claim 1 wherein the material is a plastic having an optical refractive index in the range from 1.4 to 1.6.

7. The mounting structure of claim 6 wherein the material is polycarbonate plastic.

8. The mounting structure of claim 6 wherein the material is an acrylic plastic.

9. The mounting structure of claim 6 wherein the material is tinted to filter out ambient light, passing substantially only light of the frequency of an illumination source in the wand.

10. The mounting structure of claim 1 wherein the mounting nest has a rear surface in the optical path of light passing through the sapphire ball to and from the optical assembly, said rear surface shaped to affect the optical properties of the optical train of the wand.

11. A bar code reader wand having a casing for holding an optical assembly for detecting light reflected from a bar code through a sapphire ball at the tip of the wand, said casing being made of a material having a relatively high optical index of refraction, and having an integral mounting nest for mounting the sapphire ball, said mounting nest having a front surface with a recess for mounting the sapphire ball, the shape of the recess conforming substantially to the surface of the sapphire ball, said mounting nest occupying the area between the sapphire ball and the sensor, so that the optical path of light passing through the sapphire ball to and from the optical assembly passes through the mounting nest;

means for securing the sapphire ball in the recess.

12. The mounting structure of claim 11 wherein the material is a plastic having an optical refractive index in the range from 1.4 to 1.6.

13. The mounting structure of claim 12 wherein the material is polycarbonate plastic.

14. The mounting structure of claim 12 wherein the material is an acrylic plastic.

15. The mounting structure of claim 12 wherein the material is tinted to filter out ambient light, passing substantially only light of the frequency of an illumination source in the wand.

16. The mounting structure of claim 11 wherein the mounting nest has a rear surface in the optical path of light passing through the sapphire ball to and from the optical assembly, said rear surface shaped to affect the optical properties of the optical train of the wand.

* * * * *